(12) United States Patent
Shiramshetti

(10) Patent No.: US 10,462,009 B1
(45) Date of Patent: Oct. 29, 2019

(54) REPLICATING CUSTOMERS' INFORMATION TECHNOLOGY (IT) INFRASTRUCTURES AT SERVICE PROVIDER NETWORKS

(71) Applicant: Amazon Technologies, Inc., Seattle, WA (US)

(72) Inventor: Nagaraju Shiramshetti, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 15/900,597

(22) Filed: Feb. 20, 2018

(51) Int. Cl.
G06F 15/16 (2006.01)
H04L 12/24 (2006.01)
H04L 29/08 (2006.01)
G06F 15/173 (2006.01)

(52) U.S. Cl.
CPC .......... H04L 41/0843 (2013.01); H04L 41/12 (2013.01); H04L 67/1095 (2013.01)

(58) Field of Classification Search
CPC .. H04L 41/0843; H04L 41/12; H04L 67/1095
USPC ........................................................ 709/222
See application file for complete search history.

(56) References Cited

U.S. PATENT DOCUMENTS

| 7,941,510 | B1 * | 5/2011 | Tornnasov | G06F 11/3006 709/220 |
| 8,103,842 | B2 * | 1/2012 | Murase | G06F 11/1458 707/644 |
| 8,918,488 | B2 * | 12/2014 | Umbehocker | G06F 3/0604 709/221 |
| 8,949,364 | B2 * | 2/2015 | Miloushev | G06F 9/485 709/212 |
| 9,086,926 | B2 * | 7/2015 | Dominick | G06F 9/505 |
| 9,354,905 | B2 * | 5/2016 | Nakagawa | G06F 9/455 |
| 9,461,969 | B2 * | 10/2016 | Watt | H04L 63/0272 |
| 9,565,129 | B2 * | 2/2017 | Bai | H04L 47/786 |
| 9,600,329 | B2 * | 3/2017 | Li | H04L 61/103 |
| 9,612,765 | B2 * | 4/2017 | Huang | G06F 3/0647 |
| 9,692,632 | B2 * | 6/2017 | Bhattacharya | H04L 67/1097 |
| 9,785,461 | B2 * | 10/2017 | Anerousis | G06F 9/45558 |
| 9,785,478 | B1 * | 10/2017 | Babu B R | G06F 9/5077 |

(Continued)

Primary Examiner — Melvin H Pollack
(74) Attorney, Agent, or Firm — Nicholson De Vos Webster & Elliott LLP

(57) ABSTRACT

Techniques are described that enable users to replicate information technology (IT) infrastructures located within the users' on-premises computing environments at a computing environment provided by a computing resources service provider. A user's IT infrastructure can include any number of interworking components including, for example, physical servers, virtual machines (VMs), software components, as well as various types of system configurations related to networking, security, and so forth. A user may desire to replicate an on-premises IT infrastructure at a service provider network, for example, to take advantage of the increased scalability and stability of the service provider network, for reduced infrastructure and management costs, for use in on-demand verification and testing of an infrastructure, or for the ability to automatically failover servers. A service provider network provides various services that can be used to automate processes involved in replicating a user's local IT infrastructure at a service provider network.

20 Claims, 11 Drawing Sheets

(56) References Cited

U.S. PATENT DOCUMENTS

| | | | | |
|---|---|---|---|---|
| 9,900,212 | B2* | 2/2018 | Pavlov | H04L 41/0806 |
| 9,936,015 | B2* | 4/2018 | Pohjoisvirta | G06F 16/119 |
| 9,973,380 | B1* | 5/2018 | Mittal | H04L 67/30 |
| 9,998,323 | B2* | 6/2018 | Chhatwal | H04L 41/082 |
| 10,103,946 | B2* | 10/2018 | Xiao | G06F 9/46 |
| 10,135,692 | B2* | 11/2018 | Purushotham | H04L 41/12 |
| 10,187,454 | B2* | 1/2019 | Sengodan | H04L 67/10 |
| 10,255,081 | B2* | 4/2019 | Bijani | G06F 9/44505 |
| 2009/0019137 | A1* | 1/2009 | Mishra | G06Q 10/00 |
| | | | | 709/220 |
| 2012/0204149 | A1* | 8/2012 | Joukov | G06F 11/302 |
| | | | | 717/121 |
| 2014/0223435 | A1* | 8/2014 | Chang | G06F 9/45533 |
| | | | | 718/1 |
| 2014/0250220 | A1* | 9/2014 | Kapadia | H04L 12/4625 |
| | | | | 709/224 |
| 2015/0113531 | A1* | 4/2015 | Lv | G06F 9/4856 |
| | | | | 718/1 |
| 2015/0326432 | A1* | 11/2015 | Fujie | G06F 9/44505 |
| | | | | 709/222 |
| 2015/0372938 | A1* | 12/2015 | Patel | H04L 47/70 |
| | | | | 709/226 |
| 2016/0191365 | A1* | 6/2016 | Wakeman | H04L 43/10 |
| | | | | 709/224 |
| 2017/0344618 | A1* | 11/2017 | Horowitz | G06F 11/0709 |
| 2018/0060106 | A1* | 3/2018 | Madtha | G06F 9/45558 |
| 2018/0167278 | A1* | 6/2018 | Holmes | G06F 9/5072 |
| 2018/0225177 | A1* | 8/2018 | Bhagi | G06F 16/21 |
| 2018/0260241 | A1* | 9/2018 | Khurange | G06F 3/0604 |
| 2018/0295033 | A1* | 10/2018 | Vladimirskiy | H04L 41/0806 |
| 2018/0332109 | A1* | 11/2018 | Branch | H04L 61/2514 |
| 2019/0036766 | A1* | 1/2019 | Popov | H04L 41/08 |
| 2019/0044823 | A1* | 2/2019 | Soundararajan | H04L 41/145 |

* cited by examiner

500

RECEIVE, OVER ONE OR MORE NETWORKS, A REQUEST TO REPLICATE AT A SERVICE PROVIDER NETWORK AN INFORMATION TECHNOLOGY (IT) INFRASTRUCTURE LOCATED WITHIN A CUSTOMER NETWORK 502

OBTAIN AN INFRASTRUCTURE TEMPLATE ASSOCIATED WITH THE IT INFRASTRUCTURE, THE INFRASTRUCTURE TEMPLATE INCLUDING SERVER MIGRATION SETTINGS USED TO MIGRATE AT LEAST TWO SERVERS FROM THE CUSTOMER NETWORK TO THE SERVICE PROVIDER NETWORK 504

OBTAIN REPLICATION DATA FOR THE AT LEAST TWO SERVERS FROM THE CUSTOMER NETWORK BASED ON THE SERVER MIGRATION SETTINGS 506

CREATE, BASED ON THE REPLICATION DATA, REPLICATED SERVER INSTANCES AT THE SERVICE PROVIDER NETWORK REPLICATING THE AT LEAST TWO SERVERS 508

FIG. 5

REPLICATING CUSTOMERS' INFORMATION TECHNOLOGY (IT) INFRASTRUCTURES AT SERVICE PROVIDER NETWORKS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 5 is a flow diagram illustrating operations for replicating a customer's IT infrastructure at a service provider network according to some embodiments.

DETAILED DESCRIPTION

Figure 1:
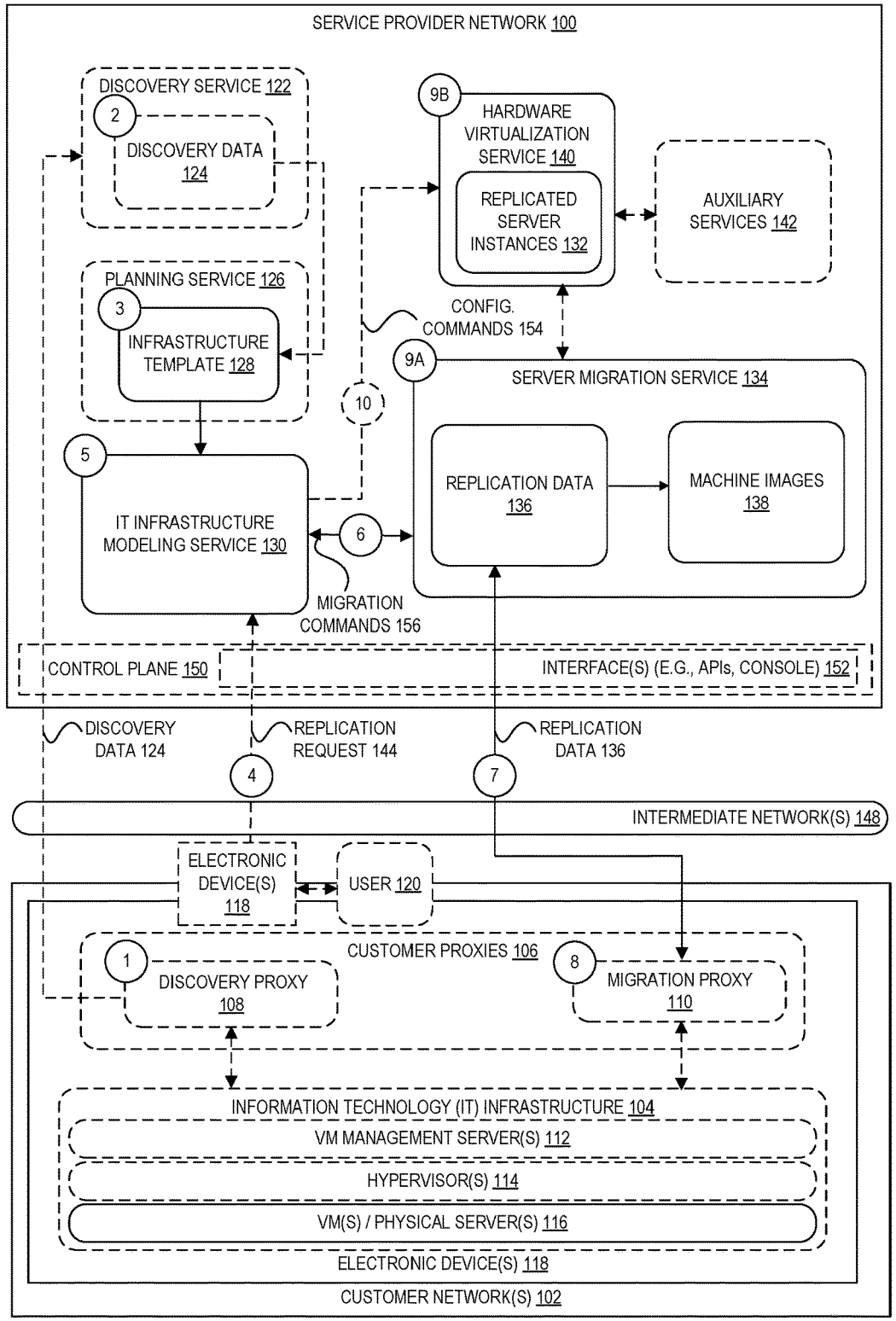
FIG. 1 is a diagram illustrating an environment for replicating a customer's information technology (IT) infrastructure at a service provider network according to some embodiments.

Various embodiments of methods, apparatus, systems, and non-transitory computer-readable storage media are described herein that enable users to replicate information technology (IT) infrastructures located within the users' on-premises computing environments at a computing environment provided by a third-party computing resource service provider. A user's IT infrastructure can include a variety of interrelated components such as, for example, physical servers, virtual machines (VMs), software components, as well as various types of system configurations related to networking, security, and so forth. A user may desire to replicate an on-premises IT infrastructure at a service provider network for any number reasons including, for example, to take advantage of the increased scalability and stability provided by a service provider network, reduced management and infrastructure costs, for use in on-demand verification and testing of the user's infrastructure or particular production stacks, and for the ability to automatically failover servers located at the customer's network to replicated server instances. According to embodiments described herein, a service provider network provides various services, such as a discovery service, a planning service, an IT infrastructure modeling service, and a server migration service, that can be used collectively to automate processes involved in replicating users' IT infrastructures at a service provider network.

In some embodiments, the replication of a user's (or "customer's") IT infrastructure at a service provider network includes processes for automatically discovering constituent components and an associated topology of the customer's infrastructure. For example, a customer may install a "discovery proxy" in the customer's network that is configured to automatically identify IT infrastructure components (physical servers, VMs, load balancers, firewalls, and so forth), system network settings (public and private subnets, routes, and so forth), and other various system configuration settings (security roles and groups, running processes, and so forth). In an embodiment, a discovery proxy generates discovery data describing the identified infrastructure components and other system configurations and sends the discovery data to a discovery service of the service provider network. In some embodiments, a planning service or another service provider service can transform the raw discovery data into a structured "infrastructure template" representing the customer's IT infrastructure and usable by other service provider services to perform various operations, including those described herein relating to replicating an IT infrastructure at a service provider network.

In an embodiment, an infrastructure template generated for a customer's IT infrastructure can include server migration settings and, optionally, additional system configuration settings. The migration settings generally include settings used to "migrate" one or more of the customer's servers from the customer's network to the service provider network. In one embodiment, the migration of a customer's server (for example, either a physical server or a VM) to a service provider network involves creating a machine image of the server (that is, a template for creating a copy of the server and possibly including a copy of the operating system, applications, and data files associated with the server) that can be used to create replicated server instances of the server at the service provider network (for example, at a hardware virtualization service provided by the service provider). The system configuration settings can be used to configure other related infrastructure settings at the service provider network (for example, network settings, security settings, and so forth), such that the customer's local IT infrastructure is accurately replicated at the service provider network.

In an embodiment, a customer can request the replication of an IT infrastructure by selecting an infrastructure template generated for the infrastructure as described above. For example, a customer may use a console or other interface associated with an IT infrastructure modeling service that manages created infrastructure templates and request the replication of a selected infrastructure. Using an infrastructure template corresponding to the selected infrastructure, the IT infrastructure modeling service can coordinate the migration of the corresponding servers and the performance of any related system configurations at the service provider network. In one embodiment, the IT infrastructure modeling service coordinates the migration of servers from the customer's network using a separate server migration service and one or more "migration proxies" installed in a customer's network. The performance of any other system configurations may involve the IT infrastructure modeling service interacting with one or more additional services of the service provider network, such as a virtual networking service, a network security service, and so forth.

In some embodiments, the replication of a customer's IT infrastructure at a service provider network optionally can be "continuous," that is, the replication can be performed multiple times such that a replicated copy of an IT infrastructure at a service provider network is synced with subsequent changes that may occur within the customer's local IT infrastructure. For example, after a customer's IT infrastructure is initially replicated at a service provider network, if changes are detected at one or more servers in the customer's local environment, the server migration service can obtain "delta" snapshots (reflecting only the changes of the block data on a server's storage device from an initial "base" snapshot of the server's storage device) of the servers in the customer's network and use the delta snapshots to update the corresponding machine images and server instances running in the service provider network. As another example, if a customer adds or removes any servers in the customer's network after an initial base replication or changes other system configurations, the planning service or IT infrastructure modeling service can update the corresponding infrastructure template to reflect those changes. The IT infrastructure can also perform any updates to the replicated server instances or other services to reflect the changes.

In some embodiments, the replication of a customer's IT infrastructure resources at a service provider network supports the automatic failover of servers running in the customer's network using two-way replication. For example, if a customer's IT infrastructure has been replicated at a service provider network such that each local server has a corresponding machine image at the service provider network, failures to servers in the customer's network can be mitigated by failing over the servers to copies created at the service provider network, or vice versa. Other servers in the customer's network can be configured to use the replicated copy of the server at the service provider network until the issue can be corrected within the customer's network. In one embodiment, a monitoring proxy installed in a customer's network and a corresponding proxy at the service provider network can maintain a mapping between servers at a customer's network and replicated server instances at the service provider network and manage the failover and failback of servers as appropriate in response to server failures.

FIG. 1 is a block diagram illustrating an environment for replicating a customer's IT infrastructure at a service provider network according to some embodiments. In some embodiments, one or more of a discovery service 122, a planning service 126, an IT infrastructure modeling service 130, a server migration service 134, a hardware virtualization service 140, and other auxiliary services 142 operate as part of a service provider network 100 and each comprise one or more software modules executed by one or more electronic devices at one or more geographic locations and data centers managed by the service provider.

A service provider network 100 allows users to utilize one or more of a variety of types of computing-related resources, such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service 140 that can execute server instances, a storage virtualization service that can store data objects, and so forth. The users (or "customers") of service provider networks 100 may utilize one or more user accounts that are associated with a customer account, though these terms may be used somewhat interchangeably depending upon the context of use. Users may interact with a service provider network 100 across one or more intermediate networks 148 (for example, the internet) via one or more interface(s) 152, such as through use of application programming interface (API) calls, via a console implemented as a website or application, etc. The interface(s) 152 may be part of, or serve as a front-end to, a control plane 150 of the service provider network 100 that includes "backend" services supporting and enabling the services that may be more directly offered to customers.

To provide these and other computing resource services, service provider networks 100 often rely upon virtualization techniques. For example, virtualization technologies may be used to allow users to control or utilize server instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple server instances can be implemented using a single electronic device. Thus, a user may directly utilize a server instance hosted by the service provider network to perform a variety of computing tasks, or may indirectly utilize a server instance by submitting code to be executed by the service provider network, which in turn utilizes a server instance to execute the code (typically without the user having any control of or knowledge of the underlying server instance(s) involved).

As indicated above, it is desirable at times for customers to replicate their IT infrastructures (for example, an IT infrastructure 104 including one or more VMs or physical servers 116 and associated system configurations) at service provider networks such as service provider network 100 (for example, such that the customer's servers 116 are replicated by one or more server instances 132 and configured in a manner that replicates the overall configuration of the IT infrastructure 104 at the customer network 102). A customer may desire to replicate an IT infrastructure at a service provider network for any number of reasons including increased scalability and stability provided by service provider networks 100, reduced management and infrastructure costs, the ability to verify and test IT infrastructures in an isolated environment, among others.

For example, FIG. 1 shows one or more customer networks 102 with one or more servers 116 which, for example, may be located within one or more data centers managed by a customer or within a network provided by a different third-party service provider. In many environments, the servers 116 include VMs, where the VMs are independently or collectively managed using one or more VM management servers 112. For example, a VM management server 112 may be configured to manage a group of VMs, such as some or all of the VMs executed within a customer network 102. VM management servers 112 provide a centralized system for managing the lifecycle of its managed VMs, including the ability to start and stop VMs, create complete or incremental snapshots (or backups) of VMs, restore VMs, modify permissions, functionalities, and configurations of VMs, and so forth.

As part of replicating a customer's on-premises IT infrastructure 104 at a service provider network 100, in some embodiments, a customer can deploy and configure one or more proxies within the customer's network 102 which perform various operations related to replicating an IT infrastructure among other processes. For example, a customer may install one or more customer proxies 106 including, for example, a discovery proxy 108 and a migration proxy 110.

A customer proxy 106, in some embodiments, is a software application (for example, a special purpose VM or a standalone application) or collection of software applications that "connect" components within the customer's data center to one or more services of the service provider network 100 (for example, a discovery service 122 or server migration service 134) to allow the services to indirectly perform operations at the customer's network (for example, operations related to discovering components of the customer's network or migrating servers from the customer's network to the service provider network). As one example, a customer proxy 106 could be a FreeBSD VM in Open Virtualization Format (OVA) that can be downloaded from the service provider network 100. To deploy a customer proxy 106, a customer can install or execute the customer proxy 106 on one or more electronic device(s) 118 (for example, in association with one or more server(s) 116) that has connectivity within the customer network 102 to reach one or more VM management servers 112 and/or service provider services.

In an embodiment, a discovery proxy 108 collects information about the constituent components and associated system configurations of the customer's IT infrastructure 104 and can send the collected data to a discovery service 122 of the service provider network 100. Similarly, in some embodiments, a migration proxy 110 connects a customer's network 102 to a server migration service 134 to enable the server migration service 134 to indirectly perform server migration-related operations at the customer's network 102, such as creating and uploading snapshots of servers 116. The operations of customer proxies 106 are described in more detail elsewhere herein.

In some embodiments, services of the service provider network 100 may send messages to customer proxies 106 via a message service (for example, a message queueing service) or may "piggy-back" on health messages that one or more of the customer proxies 106 is configured to send. Although the example customer proxies 106 are shown in FIG. 1 as being installed in a customer's network, in some embodiments, some or all of the associated service provider services can also be "agentless" and interact with components of the customer's network 102 without a corresponding proxy installed locally in the customer's network. For example, a discovery service 122 or server migration service 134 may be configured to connect directly to a VM management server 112 or other component within the customer's network to perform discovery and migration operations without the installation of a separate component in the customer's network 102.

As indicated above, customer proxies 106 may act as a local on-premises agent for various operations related to the replication of a customer's IT infrastructure 104 at the service provider network 100. In some embodiments, a customer may configure one or more customer proxies 106 with credentials used to communicate with one or more VM management servers 112 (for example, a vCenter Server™ by VMWare® or a System Center Virtual Machine Manager (SCVMM) by Microsoft®) in the customer's network 102 as well as with credentials used to communicate with the service provider network 100 to perform the associated operations.

In an embodiment, a discovery proxy 108 is able to perform operations related to discovering components of a customer's network 102. For example, at the circle labeled "1" in FIG. 1, a discovery proxy 108 automatically discovers and collects information about components of a customer's network 102, including specifications related to various servers 116 and other components of a customer's IT infrastructure 104 (for example, information specifying whether each server is a physical server or a VM, a type of CPU associated with each server, a number of CPUs associated with each server, system memory information associated with each server, information about running processes and other software installed on the servers, hostnames, IP addresses, MAC addresses, other resource allocation and utilization details, and any dependencies among the servers). A discovery proxy 108 can also identify various types of system configurations such as network settings related to the configuration of public and private subnets, routes, security groups, roles and so forth. In various embodiments, the discovery proxy 108 collects the discovery data from one or more VM management servers 112, directly from individual servers 116, from other system components such as routers, firewalls, and so forth, or from any combinations thereof.

In an embodiment, at circle "2," a discovery service 122 obtains discovery data 124 collected by a discovery proxy 108 for components of a customer's network 102. As indicated above, the discovery data 124 generally includes information about the various components and system configurations of a customer's IT infrastructure 104. The discovery data 124 can be stored in any format such as, for example, a plain text file, a comma-separate values (CSV) file, or database records, and can be associated with a customer account, for example, an account associated with the discovery proxy 108 during installation and configuration of the proxy. In general, the discovery data 124 can be used for any of a number of different purposes, including auditing a customer's IT infrastructure 104, understanding a topology and utilization information for the various components of the infrastructure, and for collecting information used to replicate an infrastructure 104 at a service provider network 100, as described herein.

Figure 2:
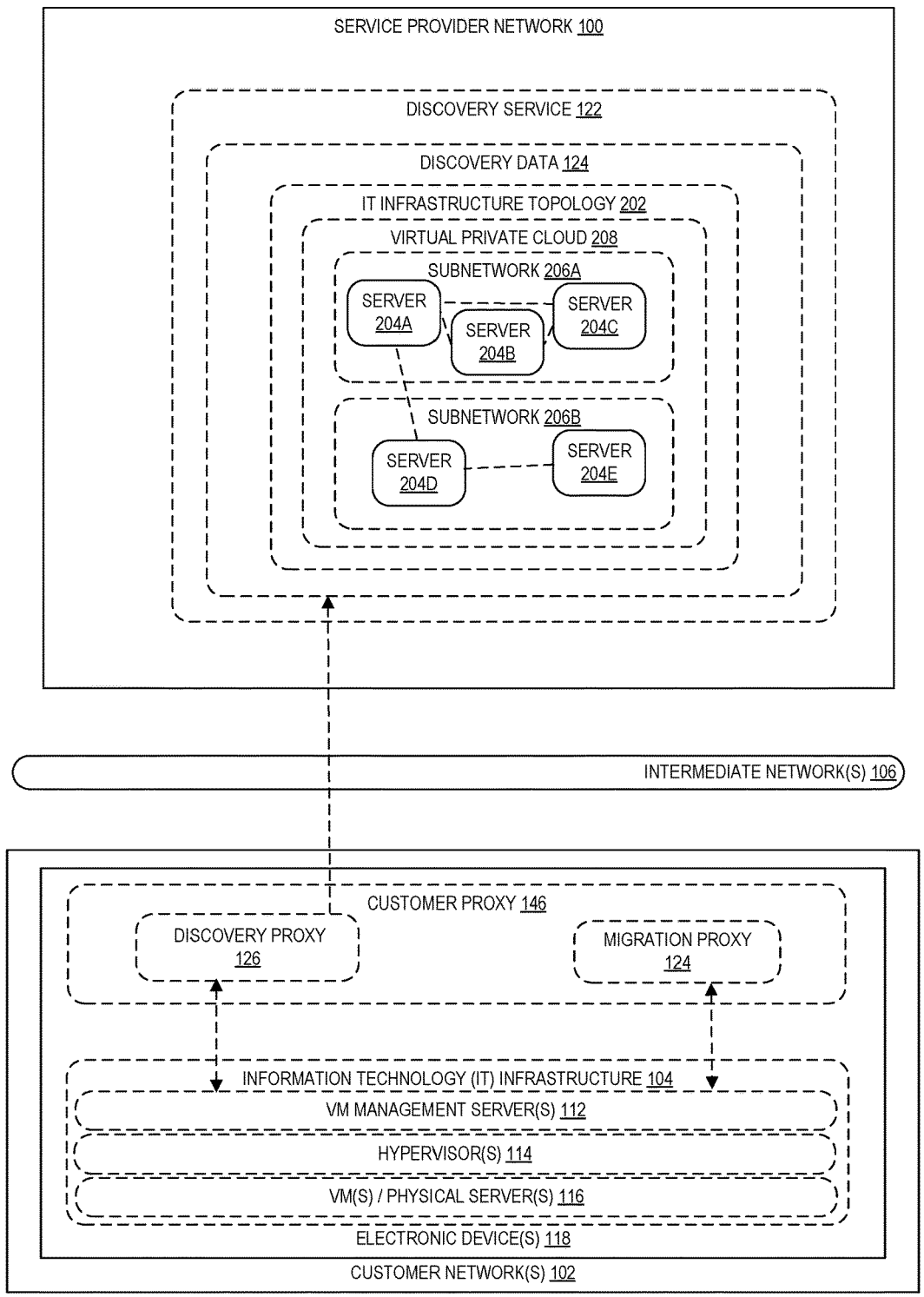
FIG. 2 is a diagram illustrating a discovery service of a service provider network obtaining discovery data representing information about a customer's IT infrastructure according to some embodiments.

FIG. 2 is a diagram illustrating a discovery service obtaining discovery data representing information about a customer's IT infrastructure according to some embodiments. FIG. 2 illustrates, for example, a discovery proxy 108 located within a customer network 102 sending discovery data 124 collected for an IT infrastructure 104 to a discovery service 122 at the service provider network 100. As indicated above, the discovery data 124 received by the discovery service 122 includes various possible types of information about components of the IT infrastructure 104, including server specifications, network configurations, security settings, information about running processes, and so forth.

The example of FIG. 2 illustrates that the discovery data 124 can be interpreted to provide a topological picture of the customer's IT infrastructure 104. As shown, the topology 202 includes a representation of several servers 204A-204E that are part of the customer's IT infrastructure and further includes a representation of a virtual private cloud (VPC) 208 including two subnetworks 206A, 206B, each of which includes one or more of the servers. The topology 202 further illustrates various relationships among the servers 204A-204E, depicted with broken lines connecting various servers, each of which might represent one or more of: a configured network route, a dependency between processes running on the servers, or any other type relationship among the servers. Although the topology 202 of the customer's IT infrastructure 104 is shown graphically in FIG. 2, the discovery data generally can be represented and stored in any format, as described above. In some embodiments, a discovery service 122 may however provide graphical interfaces that can display visual topology information similar to topology 202 based on an analysis of collected discovery data 124.

Referring again to FIG. 1, at the circle labeled "3," a planning service 126 obtains the discovery data 124 from the discovery service 122 (or possibly directly from a discovery proxy 108 or other source) and generates an infrastructure template 128. In one embodiment, an infrastructure template 128 is a structured representation of collected discovery data 124 that can be used by other services of the service provider network 100, for example, to perform operations related to replicating a customer's IT infrastructure at the service provider network 100, as described herein. In other embodiments, an infrastructure template 128 can be generated by processes other than converting discovery data 124. For example, an infrastructure template 128 may be generated manually by a customer as a text file, generated based on a graphical representation of a customer's IT infrastructure 104 created by a customer, by converting types of data other than discovery data into an infrastructure template, by importing the infrastructure template 128 from another service internal or external to the service provider network 100, and so forth.

In an embodiment, the infrastructure template 128 includes information identifying the servers 116 that comprise a customer's IT infrastructure 104, server migration settings related to migrating servers from a customer's network 102 to the service provider network 100, and any other system settings relating to the arrangement and configuration of an IT infrastructure 104. The information identifying the servers 116, for example, can include server identifiers, IP addresses, MAC addresses, base operating system, amount and type of CPUs, amount of RAM, amount of storage and other specification information included in the discovery data 124 collected for the servers or separately obtained based on the discovery data 124.

As indicated above, the creation of an infrastructure template 128 can include creating server migration settings for the servers identified by the discovery data 124, and networking settings for configuring a virtual network. In an embodiment, the server migration settings can include, for each server in the customer's IT infrastructure 104, various parameters and other settings that can be used to migrate the servers from the customer's IT infrastructure to the service provider network. As further indicated above, the migration of a server generally involves creating a machine image of the server (for example, a template for creating a copy of the server and possibly including a copy of the operating system, applications, and data files associated with the server, the state of the server at a point in time, or a block based copy of the server's hard drive) that can be used to create replicated server instances of the server at the service provider network.

In some embodiments, the migration settings can include information mapping each of a customer's on-premises servers 116 to a server instance type provided by a hardware virtualization service 140 that can be used to replicate the server at the service provider network 100. For example, discovery data 124 may indicate that one server in a customer's IT infrastructure uses a quadcore processor with a specific instruction set and 16 GB of system memory. Based on this information, a planning service 126 may map that particular server to a server instance type provided by a hardware virtualization service 140 that is most similar in terms of CPU, memory, storage, network capacity, and so forth, or to a default server instance type if no mapping can be determined. This mapping information can be used, for example, by a server migration service 134 or other service when the server is later migrated into the service provider network 100. In an embodiment, the planning service 126 can convert other information contained in the discovery data 124, for example, information about subnets, security groups, routing table information, and so forth, to an infrastructure template or a format that can be more readily understood by other services of the service provider network 100 involved in the replication process or other processes.

In some embodiments, a customer optionally can modify an infrastructure template 128 generated by a planning service 126. For example, a user 120 may access a generated infrastructure template using a console or other interface 152 provided by the planning service 126 or an IT infrastructure modeling service 130. In some embodiments, the infrastructure template 128 is stored using JavaScript Object Notation (JSON), YAML Ain't Markup Language (YAML), or other data representation that can be represented textually. In other embodiments, the infrastructure template 128 may be represented graphically (for example, using graphical representations of servers and system relationships) that can be modified by a customer. A user 120, for example, may modify the server instance types associated with particular servers, modify replication frequency settings, various networking settings, security groups, or any other configuration defined in an infrastructure template 128. A customer may manage multiple different infrastructure templates 128 for separate IT infrastructures 104 within the customer's network 102 or for different versions of the same IT infrastructure 104.

Figure 3:
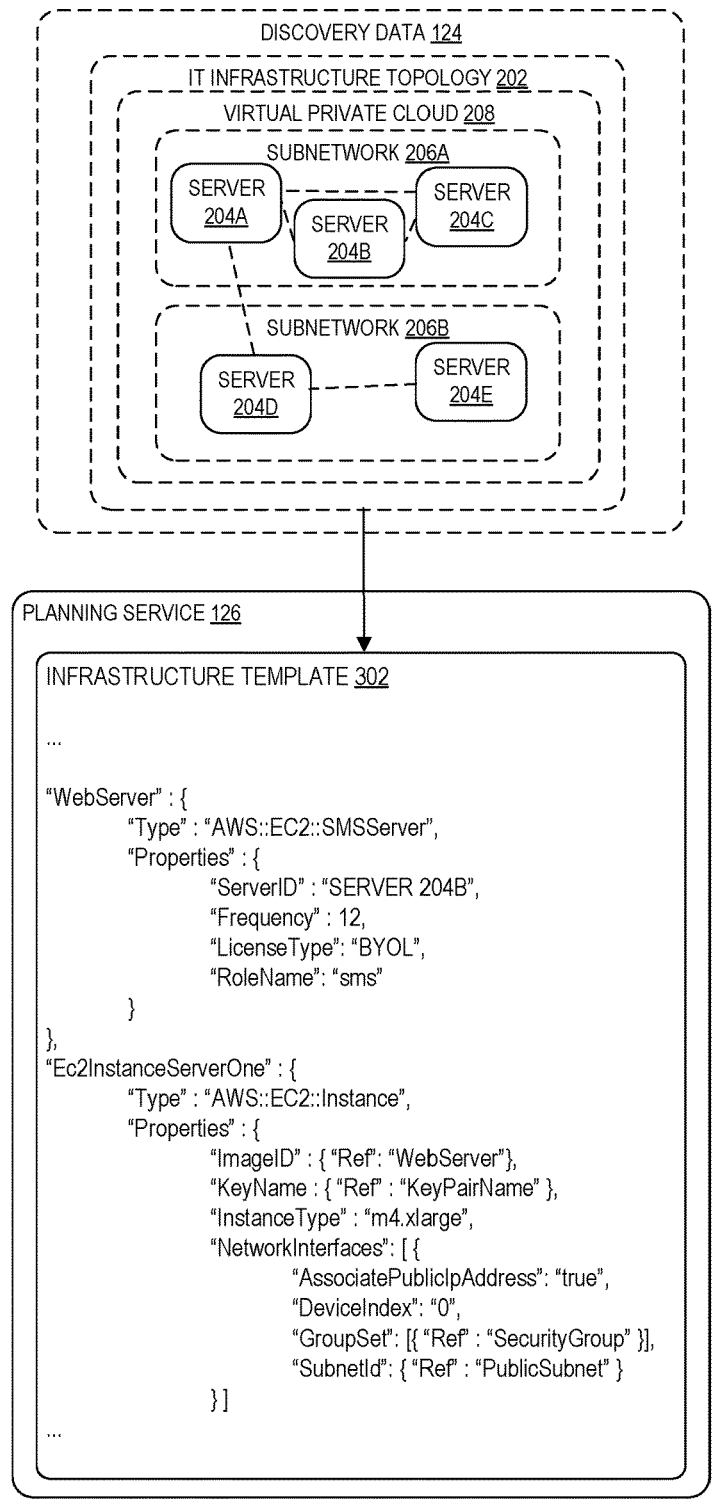
FIG. 3 is a diagram illustrating the generation of an infrastructure template based on discovery data obtained for a customer's IT infrastructure according to some embodiments.

FIG. 3 illustrates the generation of an infrastructure template based on discovery data collected for a customer's IT infrastructure. In FIG. 3, for example, discovery data 124 is obtained by a planning service 126 and converted into an example infrastructure template 302. In various embodiments, the discovery data 124 may be obtained by the planning service 126 and converted into the infrastructure template 302 either automatically or in response to a user request to generate the infrastructure template 302 based on the discovery data 124.

The infrastructure template 302 shown in FIG. 3 includes an example portion of text corresponding to one of the servers (for example, server 204B) depicted in the IT infrastructure topology 146. For example, the example portion of text may be generated based at least in part on information from the discovery data 124 providing details about the server 204B. In FIG. 3, the portion of text defines the server 204B as a "WebServer" and includes various related server migration settings and other related configurations. For example, the text includes a "ServerID" property that serves as an identifier of the server 204B in the customer's IT infrastructure, a "frequency" property that indicates a frequency with which the server is to be replicated at the service provider network 100, a server license type, and an associated server role. The portion of text further includes information about the configuration of a server instance to be used to replicate the server 204B at the service provider network 100, including a server instance type to be used (for example, "m4.xlarge"), network settings (for example, specified by the "AssociatePublicIpAddress" and "SubnetId" properties), and security settings (for example, specified by the "SecurityGroup" property). As indicated above, a planning service 126 may generate the settings related to a server instance to be used for the server based on a determined mapping of the server to a server instance type provided by the service provider network 100 most similar to the server at the customer's network 102.

Additional examples of resources that may be defined in an infrastructure template 302 are illustrated below. For example, the following is an example definition of a virtual private cloud (VPC):

```
"VPC": {
  "Type": "VPC",
  "Properties": {
    "CidrBlock": "170.20.0.0/16",
    "EnableDnsSupport": true,
    "EnableDnsHostnames": true,
    "InstanceTenancy": "default",
    "Tags": [{
      "Key": "Name",
      "Value": {
        "Ref": "StackName"
      }
    }]
  }
},
```

The following is an example definition of a gateway enabling communication between instances in a VPC and the internet:

```
"InternetGateway": {
  "Type": "InternetGateway",
  "Properties": {
    "Tags": [{
      "Key": "Name",
      "Value": {
        "Ref": "StackName"
      }
    }]
  }
},
"AttachGateway": {
  "Type": "VPCGatewayAttachment",
  "Properties": {
    "VpcId": {
      "Ref": "VPC"
    },
    "InternetGatewayId": {
      "Ref": "InternetGateway"
    }
  }
},
```

The following is an example definition of a public subnet:

```
"PublicSubnet": {
  "Type": "Subnet",
  "Properties": {
    "VpcId": {
      "Ref": "VPC"
    },
    "CidrBlock": "172.31.0.0/24",
    "MapPublicIpOnLaunch": "true",
    "Tags": [{
      "Key": "Name",
      "Value": {
        "Ref": "StackName"
      }
    }]
  }
},
```

The following is an example definition of a public route table:

```
"PublicRouteTable": {
  "Type": "RouteTable",
```

-continued

```
            "Properties": {
                "VpcId": {
                    "Ref": "VPC"
                },
                "Tags": [{
                    "Key": "Name",
                    "Value": {
                        "Ref": "StackName"
                    }
                }]
            }
        },
```

The following is an example definition of a public route:

```
"PublicRoute": {
    "Type": "Route",
    "Properties": {
        "RouteTableId": {
            "Ref": "PublicRouteTable"
        },
        "DestinationCidrBlock": "0.0.0.0/0",
        "GatewayId": {
            "Ref": "InternetGateway"
        }
    }
},
"PublicSubnetRouteTableAssociation": {
    "Type": "SubnetRouteTableAssociation",
    "Properties": {
        "RouteTableId": {
            "Ref": "PublicRouteTable"
        },
        "SubnetId": {
            "Ref": "PublicSubnet"
        }
    }
},
```

The following is an example of a security group definition, including example ingress rules:

```
"SecurityGroup": {
    "Type": "SecurityGroup",
    "Properties": {
        "GroupDescription": "Enable HTTP access
        via port 80 and SSH access.",
        "VpcId": {
            "Ref": "VPC"
        },
        "SecurityGroupIngress": [
            {
                "IpProtocol": "tcp",
                "FromPort": "80",
                "ToPort": "80",
                "CidrIp": "0.0.0.0/0"
            },
            {
                "IpProtocol": "tcp",
                "FromPort": "22",
                "ToPort": "22",
                "CidrIp": {
                    "Ref": "SSHLocation"
                }
            }
        ]
    }
},
```

The following is an example definition of a web server and a database server, including example migration settings for each server:

```
"WebServer": {
    "Type": "SMSServer",
    "Properties": {
        "ServerId": "s-68a541344",
        "Frequency": 12,
        "LicenseType": "BYOL",
        "RoleName": "sms"
    }
},
"DBServer" : {
    "Type" : "SMSServer",
    "Properties": {
        "ServerId": "s-68a54634",
        "Frequency" : 12,
        "LicenseType": "BYOL",
        "RoleName": "sms"
    }
},
"Ec2InstanceServerOne" : {
    "Type": "Instance",
    "Properties" : {
        "ImageId" : { "Ref": "WebServer"},
        "KeyName" : { "Ref" : "KeyPairName" },
        "InstanceType": "m4.xlarge",
        "NetworkInterfaces": [ {
            "AssociatePublicIpAddress": "true",
            "DeviceIndex": "0",
            "GroupSet": [{ "Ref" : "SecurityGroup" }],
            "SubnetId": { "Ref" : "PublicSubnet" }
        }],
        "Tags": [{
            "Key": "Name",
            "Value": {
                "Ref": "StackName"
            }
        }]
    }
},
"Ec2InstanceDBServer": {
    "Type": "Instance",
    "Properties": {
        "ImageId": { "Ref": "DBServer"},
        "KeyName": {
            "Ref": "KeyPairName"
        },
        "InstanceType": "m4.xlarge",
        "NetworkInterfaces": [{
            "AssociatePublicIpAddress": "true",
            "DeviceIndex": "0",
            "GroupSet": [{
                "Ref": "SecurityGroup"
            }],
            "SubnetId": { "Ref": "PublicSubnet" }
        }],
        "Tags": [{
            "Key": "Name",
            "Value": { "Ref": "StackName" }
        }]
    }
}
```

As indicated above, the example portion of the infrastructure template 302 shown in FIG. 3 illustrates example settings related to one particular server of the customer's IT infrastructure. However, a same infrastructure template 302 can include settings related to any number of additional servers in the customer's IT infrastructure to be replicated at the service provider network 100, as well settings related to other types of resources such as, for example, load balancers, firewalls, and so forth, and any other types of system settings, as illustrated above. The format of the infrastructure template 302 shown in FIG. 3 and elsewhere herein is provided for illustrative purposes only; other infrastructure templates can be represented in any textual or other type of format.

In an embodiment, at the circle labeled "4," a user requests the replication of the user's IT infrastructure by generating a replication request 144 sent to an IT infrastructure modeling service 130. For example, a console 152 may be configured with user interface elements that allow a user 120 to request and optionally configure aspects of the IT infrastructure replication process, for example, to identify a particular infrastructure template 128 or to specify particular components of the customer's IT infrastructure 104 to replicate. For example, in some embodiments, a user 120 may select an entire infrastructure template 128 for replication, or only a subset of the resources identified by an infrastructure template 128 for replication.

In an embodiment, a replication request 144 identifies an infrastructure template 128 corresponding to the IT infrastructure 104 that the user 120 desires to replicate at the service provider network 100. For example, the user 120 may use an interface 152 to acquire a list of one or more infrastructure templates 128 that have been "registered" with the IT infrastructure modeling service 130 (for example, via configuration data sent from the discovery proxy 108 to the discovery service 122 under the customer's account). The user 120 may then, for example, select one or more of the infrastructure templates 128 that correspond to infrastructure(s) desired for replication by the user, the input causing an electronic device 118 to issue a replication request 144 (which may be, for example, an API call, a HyperText Markup Language (HTML) form submission, or the like) identifying the topology to be replicated.

In an embodiment, at the circle labeled "5," the IT infrastructure modeling service 130 obtains and analyzes the infrastructure template 128 corresponding to the user's replication request 144. For example, the IT infrastructure modeling service 130 may analyze a selected infrastructure template 128 to identify a list of servers 116 to be migrated to the service provider network 100, identify other system configuration operations to be performed, and identify any other operations involved in replicating the customer's IT infrastructure at the service provider network 100. As described below, the analysis of the infrastructure template 128 may result in the IT infrastructure modeling service 130 performing one or more operations itself, or instructing other services of the service provider network 100 to perform various operations, to perform the requested replication.

In an embodiment, at the circle labeled "6," the IT infrastructure modeling service 130 sends one or more migration commands 156 to the server migration service 134. For example, each of the migration commands 156 may correspond to a server identified in the infrastructure template 128 as a server to be migrated to the service provider network 100. A migration command 156 can include one or more server migration settings identified in the infrastructure template 128 and which can be used by the server migration service 134 to migrate the corresponding server. For example, the server migration settings may include one or more: an identifier of the server at the customer network 102 to be migrated, a replication frequency for migrating the server, a server instance type to be used to replicate the server at the service provider network 100, and so forth. In some embodiments, the migration commands 156 can be sent using, for example, an API call or a messaging service to send the commands to the server migration service 134 or, in other embodiments, the server migration service 134 can obtain the migration commands 156 using a polling mechanism.

In an embodiment, at the circle labeled "7," the server migration service 134 sends instructions to a migration proxy 110 based on the received migration commands 156. In some embodiments, the server migration service 134 sends the instructions to the migration proxy 110 using, for example, a polling mechanism where the migration proxy 110 periodically checks with the server migration service 134 for new instructions (for example, via a RESTful API call to an API endpoint). In other embodiments, a "push" messaging technique, such as Web push, Hypertext Transfer Protocol (HTTP) server push, long polling, and so forth, can be used to notify a migration proxy 110 of new migration instructions. The migration instructions, in some embodiments, specify one or more migration-related operations to be performed by the migration proxy 110 and an identifier of one or more servers 116 that the migration proxy 110 is to perform the operations upon.

In an embodiment, at the circle labeled "8," a migration proxy 110 receives migration instructions and performs the assigned operations. The performance of the assigned operations may include sending commands to an associated VM management server 112 (for example, to cause the VM management server 112 to perform certain operations with respect to the servers to be migrated) or possibly interacting directly with the servers 116 to perform the operations. A variety of different types of operations may be performed by a migration proxy 110 in response to received migration instructions including, but not limited to, validating received instructions, creating a base (or "full") snapshot of one or more identified servers 116, creating a storage location (or "bucket") within the service provider network 100 to store snapshot(s) (for example, using a storage virtualization service of the service provider network 100), uploading a base snapshot to the storage location, uploading a delta snapshot to the storage location, deleting artifacts that have been uploaded (for example, one or more snapshots), and consolidating a snapshot.

For example, in some embodiments, a migration proxy 110 performs part of the process of migrating a VM or physical server 116 by obtaining a full snapshot of the VM or physical server, creating a data storage object (for example, a bucket or folder) at a storage virtualization service, and uploading the snapshot for storage in the created data storage object. Similarly, if the migration instructions request a delta migration of a VM or physical server 116, the migration proxy 110 can obtain a delta snapshot of the VM or physical server and upload the delta snapshot to the service provider network. In other embodiments, instead of or in addition to discrete snapshots, a migration proxy 110 may obtain a stream of data reflecting changes to a VM or physical server 116 and the streamed data can be uploaded to the service provider network 100 (either each time a change is detected or by batching changes and periodically uploading the data). For example, an agent may be installed in the operating system (OS) of a physical server 116 or an agent can interact with a hypervisor hosting a VM 116 such that a filter driver streams information reflecting data written to a physical or virtual disk to the migration proxy 110.

In an embodiment, at the circles labeled 9A and 9B, the IT infrastructure modeling service 130 and server migration service 134 perform operations to complete an initial replication of a customer's IT infrastructure 104. For example, at the circle labeled "9A," a server migration service 134 receives replication data 136 from a migration proxy 110, or a message identifying a location at a storage virtualization service at which the replication data 136 is stored. In one embodiment, the server migration service 134 may forward the message to the IT infrastructure modeling service 130 or a separate server import service (for example, via one or more API calls) specifying a storage location of the replication data 136. In an embodiment, the IT infrastructure modeling service 130, server migration service 134, or other service can then perform some or all of the operations involved in replicating the server(s) at the service provider network 100.

In some embodiments, the replication of a server at the service provider network 100 includes generating a machine image 138 based on the obtained replication data 136 for the server. For example, the generation of a machine image 138 for a server can include one or more of: downloading the replication data 136 for the server from a storage virtualization service or other storage location, creating disk volume(s) for the server (for example, at a storage service which be part of or separate from the storage virtualization service), converting the replication data 136 into a format that can be stored in the created disk volume(s), storing the converted data in the volume(s), injecting drivers into the volume(s), performing a test boot of a migrated server contained in the volume(s), generating snapshots of the migrated server, generating a machine image of the migrated server that can be used to create additional server instances at the service provider network 100 (for example, at a hardware virtualization service 140), and storing the machine image 138, volume(s), and snapshot(s) at one or more storage locations accessible to the associated customer's account. In various embodiments, one or more of the above operations may be performed by an IT infrastructure modeling service 130, a server migration service 134, or any other component of the service provider network 100.

In an embodiment, at the circle labeled "9B," the IT infrastructure modeling service 130 or server migration service 134 creates one or more replicated server instances 132 based on the machine images 138 created at circle "9A." As indicated above, in an embodiment, the server migration service 134 or other service generate machine images 138, each of which can be launched as one or more server instances in a hardware virtualization service 140 of the service provider network 100. For example, a server migration service 134 may notify the IT infrastructure modeling service 130 when a machine image 138 for a server identified in an infrastructure template 128 is generated and, in response, the IT infrastructure modeling service 130 can use the machine image to create a replicated server instance 132 at the hardware virtualization service 140 according to the infrastructure template 128.

In an embodiment, at the circle labeled "10," the IT infrastructure modeling service 130 optionally performs one or more additional configurations to replicate the customer's IT infrastructure at the service provider network. The additional configurations, for example, may relate to configuring various network settings (public subnets, private subnets, routes, and so forth) and security settings (configuring roles, security groups, and so forth) relative to the replicated server instances 132 created at circle "9B." In one embodiment, the IT infrastructure modeling service 130 may generate one or more configuration commands 154 to perform the various configurations at the hardware virtualization service 140, auxiliary services 142, or both. The additional configurations may be based on system configuration settings contained in the infrastructure template 128 or elsewhere.

In an embodiment, the replication of a customer's IT infrastructure 104 at a service provider network 100 can involve a single migration of the customer's servers or the replication of the infrastructure can continue over time. As indicated above, each of a customer's servers 116 migrated into the service provider network 100 may be associated with a replication frequency value (for example, usually expressed in hours) and which may be specified in the infrastructure template. The IT infrastructure modeling service 130 or server migration service 134 can use the frequency value to schedule additional replications of one or more servers 116 in the customer's network to the service provider network 100. The ability to continuously replicate the servers 116 of a service provider network 100, for example, enables a customer to incrementally replicate and test a copy of the customer's IT infrastructure 104 at the service provider network 100 instead of switching over without any testing.

In an embodiment, a server migration service 134 can create delta replication jobs to continuously replicate one or more the servers 116. For example, based on the replication frequency value associated with a server 116 previously migrated into the service provider network 100, the server migration service 134 can instruct a migration proxy 110 to create a "delta" snapshot of the server and to upload the delta snapshot to the service provider network 100. In this example, the server migration service 134 can obtain an uploaded delta snapshot and created an updated machine image 138 and/or replicated server instance 132 based on the delta snapshot.

In an embodiment, a customer proxy 106 can detect other changes to a customer's IT infrastructure after an initial replication and update a corresponding infrastructure template 128 to reflect the changes. For example, after an initial replication, a discovery proxy 108 may detect that one or more servers 116 have been added or removed from the customer's IT infrastructure 104, or that other network or security settings have been changed. This information can be sent in the form of additional discovery data 124 to the discovery service 122. In response to receiving the additional discovery data 124, a planning service 126 or other server can apply changes to a corresponding infrastructure template 128 so that it better reflects the current state of the customer's IT infrastructure 104.

In some embodiments, some or all of the operations involved in replicating a customer's IT infrastructure to a service provider network 100, as described above, can be performed within a customer's virtual private cloud (VPC) of computing resources provided by the service provider network 100. At a high level, a VPC is a service that allows customers to manage a logically isolated set of servers and other resources provided by the service provider network 100. In these examples, the server migration service 134 or other services may be configured to instruct components within the customer's VPC to perform some or all of the operations described above in connection with the replicating a customer's IT infrastructure 104.

In some embodiments, once a customer has replicated an IT infrastructure at a service provider network 100, the customer may decide to delete some or all of the replicated IT infrastructure at the service provider network 100. For example, a customer might replicate an IT infrastructure for the purposes of testing the infrastructure in a test environment and, once the testing is complete, the customer may desire to delete the replicated infrastructure and to implement additional changes to the local infrastructure based on the testing. If the customer desires to replicate the customer's IT infrastructure again for further testing or other purposes, the replication can be based on the previously created infrastructure template 128 or based on an updated version of the template based on detected changes to the customer's IT infrastructure, as described above.

In some embodiments, the ability to replicate components of a customer's IT infrastructure 104 at a service provider network 100 can be used to support the automatic failover of servers 116 running in a customer's computing environment to replicated server instances running in a service provider's network 100, and vice versa. For example, if a machine image 138 has been generated at the service provider network 100 for one or more servers 116 located within the customer's network 102, and if any of the customer's servers 116 fails in the customer's local environment, a replicated copy of the server can be created at the service provider network 100 and used in its place until the server failure can be corrected.

Figure 4:
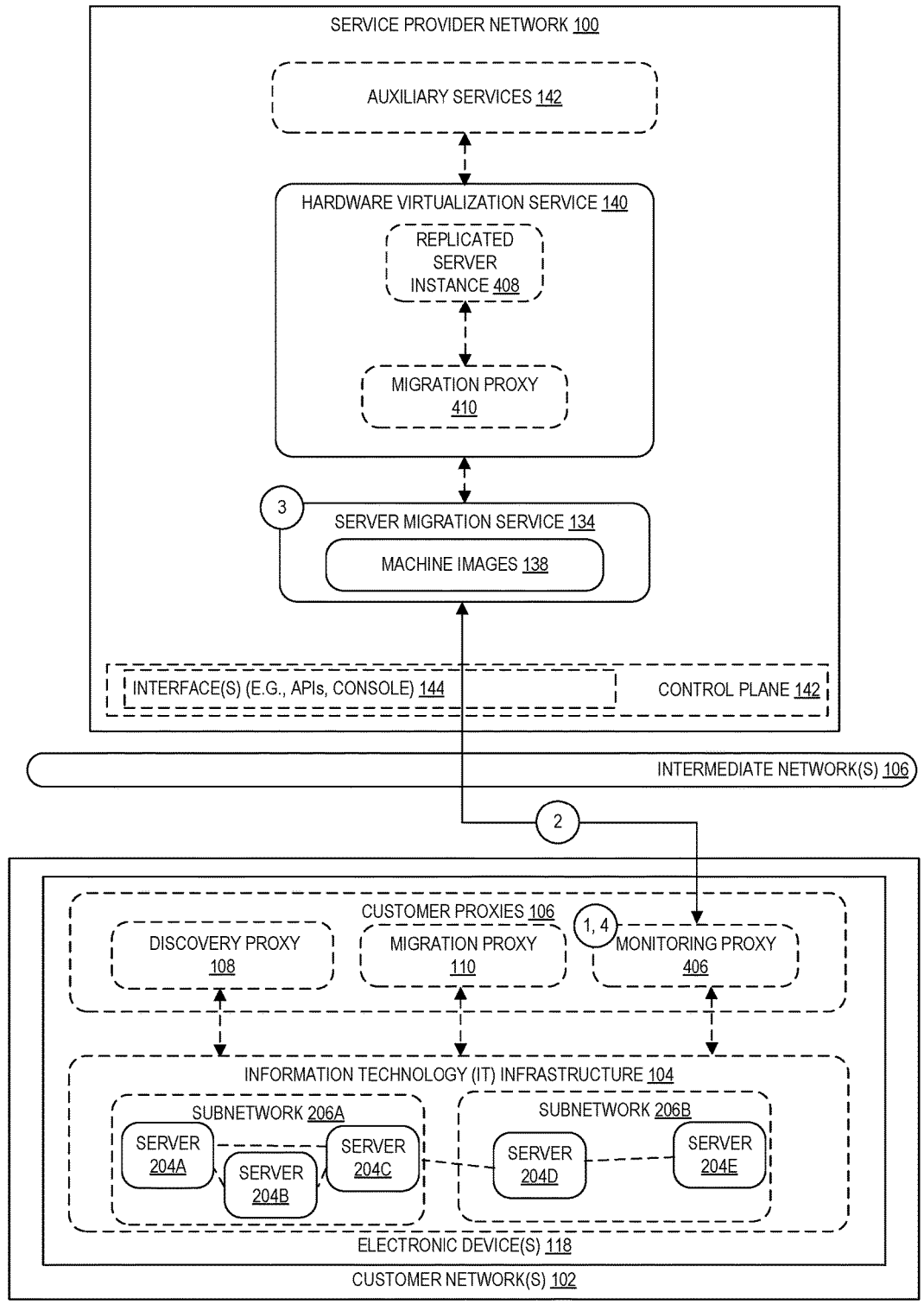
FIG. 4 is a diagram illustrating the ability to failover servers running in a customer's network to replicated copies of the servers running in a server provider network according to some embodiments.

FIG. 4 is a diagram illustrating the ability to failover servers running in a customer's network to replicated copies of the servers running in a service provider network according to some embodiments. Similar to FIG. 1, FIG. 4 includes a service provider network 100 and a customer network 102. The service provider network 100 includes a plurality of service provider services, including a server migration service 134, a hardware virtualization service 140, and various other auxiliary services 142. The example shown in FIG. 4 assumes that a customer has replicated at least a portion of an IT infrastructure 114 at the service provider network 100 (for example, using the processes described above in reference to FIGS. 1-3) resulting in the creation of machine images 138 corresponding to one or more of the servers 404A-404E.

In an embodiment, the customer network 102 optionally includes several customer proxies 106, including a discovery proxy 108 and a migration proxy 110, as described above in FIG. 1. In the example of FIG. 4, the customer network 102 further includes a monitoring proxy 406, which can be used to monitor the health and performance of the servers 204A-204E operating in the customer's network. Similar to the discovery proxy 108 and migration proxy 110, in some embodiments, the monitoring proxy 406 is a software application (for example, a special purpose VM or a standalone application) that can interact with the servers 204A-204E on behalf of the server migration service 134 and possibly other services of the service provider network 100. In other embodiments, the monitoring of the customer network 102 can be performed by components outside of the customer network 102, such as by a monitoring service of the service provider network 100.

In an embodiment, a hardware virtualization service 140 also includes a migration proxy 410 configured to perform migration related operations related to replicated server instances 408 created at the hardware virtualization service 140. In an embodiment, one or both of the monitoring proxies 406 and migration proxy 410 maintains a mapping between one or more of servers 204A-204E, corresponding machine images 138 at the server migration service 134, and any replicated server instances 408 running at the hardware virtualization service 140. In some embodiments, the mapping between servers in the customer's IT infrastructure 104 and the service provider network 100 includes an indication of whether a server in the customer network 102 or service provider network 100 is currently "active" or "passive." For example, initially each of the servers 204A-204E in a customer's IT infrastructure 104 may begin as "active" when the servers are operating as intended. As described in the processes below, a server that fails in the customer's IT infrastructure 104 can be changed to a "passive" status and a replicated copy of the server created at the service provider network 100 can be marked as "active." If the issue causing the failure of the server is later corrected, the server in the customer's IT infrastructure 104 may be marked again as "active" and the replicated copy as "passive."

In an embodiment, initially a customer's IT infrastructure 104 is operating as expected, that is, each of the servers 204A-204E in the customer's IT infrastructure 104 is functioning as intended and without any known performance issues. In this example, each of the servers 204A-204E in the customer's network 102 is associated with an "active" state, as described above. The monitoring proxy 406 monitors the health of one the or more servers 204A-204E, for example, using a "heartbeat" signal or other monitoring technique. During this time, the monitoring proxy 406 or migration proxy 110 may periodically create snapshots of one or more of the servers 204A-204E that are sent to the service provider network 100. The server migration service 134 can use these uploaded snapshots to update any corresponding machine images 138 so that the machine images 138 remain relatively in sync with the state of the servers 204A-204E in the customer's network 102.

In an embodiment, at circle "1," the monitoring proxy 406 detects that a server in the customer's IT infrastructure 104 has failed or is otherwise operating improperly. For example, the monitoring proxy 406 may notice that a server does not respond to a heartbeat signal, or that particular error messages are received from the server, or the monitoring proxy 406 may detect that a server is suffering significant performance issues.

In an embodiment, at circle "2," the monitoring proxy 406 sends a failover message to the server migration service 134 identifying the failed server. For example, the monitoring proxy 406 may send one or more API calls or other messages to the server migration service 134 that provide an identification of the failed server in the customer's IT infrastructure 104.

In an embodiment, at circle "3," the server migration service 134 receives the failover message and, in response, obtains a machine image 138 associated with the failed server and creates a replicated server instance 408 of the failed server at the hardware virtualization service 140. In other embodiments, a replicated server instance 408 may have already been created prior to the server migration service 134 receiving the failover message, for example, as part of an IT infrastructure replication.

In an embodiment, at circle "4," the monitoring proxy 406 modifies network configurations within the customer network 102 such that network traffic is routed to the replicated server instance 408 instead of to the failed server at the customer network 102. For example, the monitoring proxy 406 may update DNS entries or other networking configurations associated with the IT infrastructure 104 so that the network traffic is routed to the replicated server instance. In this manner, replicated server instances at the service provider network 100 can be used to efficiently and seamlessly failover servers located within the customer network 102.

In an embodiment, after a failover has been performed for a server at the customer network 102, the monitoring proxy 406 may eventually detect that the failed server is operational again. For example, the failed server may have automatically rebooted, a system administrator may manually correct the error, or any other process may fix the failed server. In an embodiment, the monitoring proxy 406 may send a failback message to the server migration service 134 if it is desired to use the corrected server at the customer's network 102 again. In response to receiving the failback message, the server migration service 134 creates replication data based on the replicated server instance 408 at the service provider network 100. For example, the replication data in this example may reflect any changes that occurred at the replicated server instance 408 during the time that the server in the customer's IT infrastructure 104 was inoperable.

In an embodiment, the server migration service 134 sends the replication data for the replicated server instance 408 to the monitoring proxy 406 (or another component at the customer's network 102) so that the repaired server can be updated with the current replication data. In an embodiment, once the replication data has been sent back to the customer network 102 and the server is updated using the replication data, the server at the service provider network 100 can be marked as "active" and the replicated server instance 408 marked as "passive." In an embodiment, reverting the server at the customer's network 102 back to an "active" state can include reconfiguring DNS entries and other network configurations such that other servers in the customer's network resume communicating with the server at the customer's network 102.

FIG. 5 is a flow diagram illustrating operations 500 for replicating a customer's IT infrastructure at a service provider network according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by various components of the other figures.

In an embodiment, the operations 500 include, at block 502, receiving, over one or more networks, a request to replicate at a service provider network an information technology (IT) infrastructure located within a customer network. Referring to FIG. 1, for example, an IT infrastructure modeling service 130 may receive a replication request 144 generated by a user 120. The replication request 144 may indicate, for example, a desire to replicate an IT infrastructure 104 at a customer network 102. In an embodiment, the IT infrastructure includes one or more of: a virtual server, a physical server, a public subnet, a private subnet, a virtual private cloud (VPC) configuration, a routing table, a security group configuration, a software configuration. For example, the IT infrastructure 104 may include any number of servers 116 and associated network configurations, security configurations, and any other settings.

In an embodiment, the operations 500 include, at block 504, obtaining an infrastructure template associated with the IT infrastructure, the infrastructure template including server migration settings used to migrate at least two servers from the customer network to the service provider network. In one embodiment, the server migration settings include a mapping between at least one of the at least two servers and a server instance type supported by the service provider network. For example, in response to receiving a replication request 144, an IT infrastructure modeling service 130 may obtain an infrastructure template 128 corresponding to the customer's IT infrastructure 104.

In an embodiment, the operations further include obtaining discovery data from the customer network, the discovery data identifying the at least two servers of the IT infrastructure located in the customer network. In an embodiment, the infrastructure template is generated based on the discovery data obtained from the customer network. For example, a discovery proxy 108 may generate discovery data 124 describing components of a customer's IT infrastructure 104. In an embodiment, a planning service 126 or other service converts the discovery data 124 obtained for the customer's IT infrastructure 104 into an infrastructure template 128.

In an embodiment, the operations 500 include, at block 506, obtaining replication data for the at least two servers from the customer network based on the server migration settings. In an embodiment, the replication data includes one or more of: a disk snapshot, a memory snapshot, a machine image. In an embodiment, the replication data is created by a migration proxy at the customer network, where creating the replication data by the migration proxy includes one or more of: obtaining disk snapshots from a VM manager used to manage the servers, obtaining a disk snapshot of a physical server corresponding to the server, and obtaining a data stream reflecting changes a disk associated with the servers. For example, a server migration service 134 may send replication instructions to a migration proxy 110 located within a customer network 102 and the migration proxy 110 can generate and send replication data 136 for one or more identified servers 116 to the service provider network 100.

In an embodiment, the operations 500 include, at block 508, creating, based on the replication data, replicated server instances at the service provider network replicating the at least two servers. In an embodiment, creating each replicated server instance at the service provider network includes one or more of: creating a disk volume, storing a VM in the disk volume, injecting drivers into the disk volume, creating a snapshot of the VM stored in the disk volume, creating a machine image of the VM based on the snapshot, storing the machine image at a storage location accessible to the customer. For example, a server migration service 134 may generate one or more machine images 138 based on the replication data 136 obtained from the customer network 102. The server migration service 134, IT infrastructure modeling service 130, or other service may further create one or more replicated server instances 132 at a hardware virtualization service 140 based on the generated machine images 138.

In an embodiment, the infrastructure template further includes system configuration settings relating to one or more of: a subnet configuration, a security group configuration, a routing configuration, and the operations further include configuring one or more system settings related to the replicated server instances at the service provider network based on the system configuration settings.

In an embodiment, the operations further include obtaining delta replication data from the customer network for a server of the at least two servers, and updating a replicated instance corresponding to the at least one server at the service provider network based on the delta replication data. For example, a server migration service 134 may send migration instructions to a migration proxy 110 to obtain one or more delta snapshots of servers 116 at the customer network 102. The obtaining of delta replication data, for example, can be based on a replication frequency value associated with various servers in an infrastructure template 128.

Figure 6:
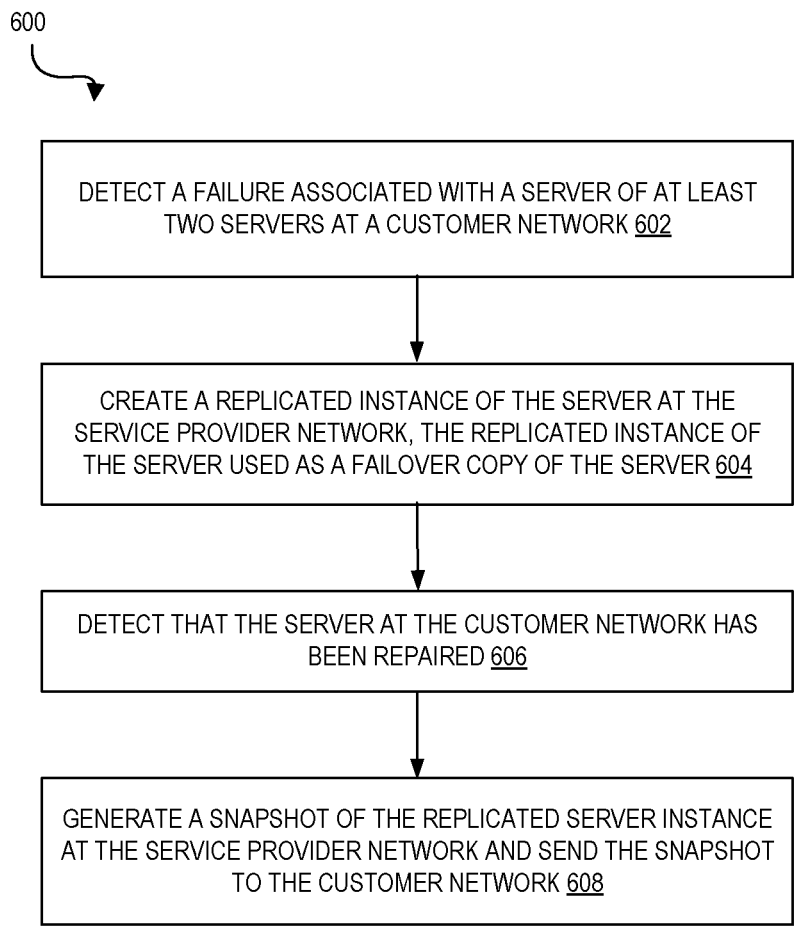
FIG. 6 is a flow diagram illustrating operations for performing automatic failover of servers running in a customer's computing environment to replicated servers running in a service provider network according to some embodiments.

FIG. 6 is a flow diagram illustrating operations 600 for replicating a customer's IT infrastructure at a service provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by various components of the other figures.

In an embodiment, the operations 600 include, at block 602, detecting a failure associated with a server of at least two servers at a customer network. Referring to FIG. 4, for example, a server migration service 134 may receive a failover message from a monitoring proxy 406 installed within a customer network 102, the failover message indicating a failure of one or more of servers 404A-404E.

In an embodiment, the operations 600 further include, at block 604, creating a replicated instance of the server at the service provider network, where the replicated instance of the server is to be used as a failover copy of the server. For example, a server migration service 134 may create a replicated server instance 408 at a hardware virtualization service 140 using on a machine image 138 corresponding to a failed server. In an embodiment, a monitoring proxy 406 or another component of the customer network 102 may configure network settings at the customer network 102 so that other servers in the network communicate with the replicated server instance 408 at the service provider network 100 instead of the failed server.

In an embodiment, the operations 600 further include, at block 606, subsequent to using the replicated instance of a server as a failover copy of the server, detecting that the server at the customer network is repaired. For example, a server migration service 134 may receive a failback message from a monitoring proxy 406 indicating that a previously failed server has been repaired.

In an embodiment, the operations 600 further include, at block 608, in response to detecting that the server at the customer network is repaired, generating a snapshot of the replicated instance of the server at the service provider network and sending the snapshot to the customer network. In an embodiment, the snapshot can be used at the customer network to update the repaired server to reflect changes that have occurred at the service provider network to the replicated instance. For example, a server migration service 134 may generate a snapshot of the replicated server instance 408 at the service provider network 100 and send the snapshot to the customer network 102. The monitoring proxy 406, migration proxy 110, or other component may use the received snapshot to update the repaired server at the customer network 102. In an embodiment, the monitoring proxy 406 or other component reconfigures network settings at the customer network 102 so that the other servers again communicate with the local server instead of the replicated server instance 408 at the service provider network 100.

Figure 7:
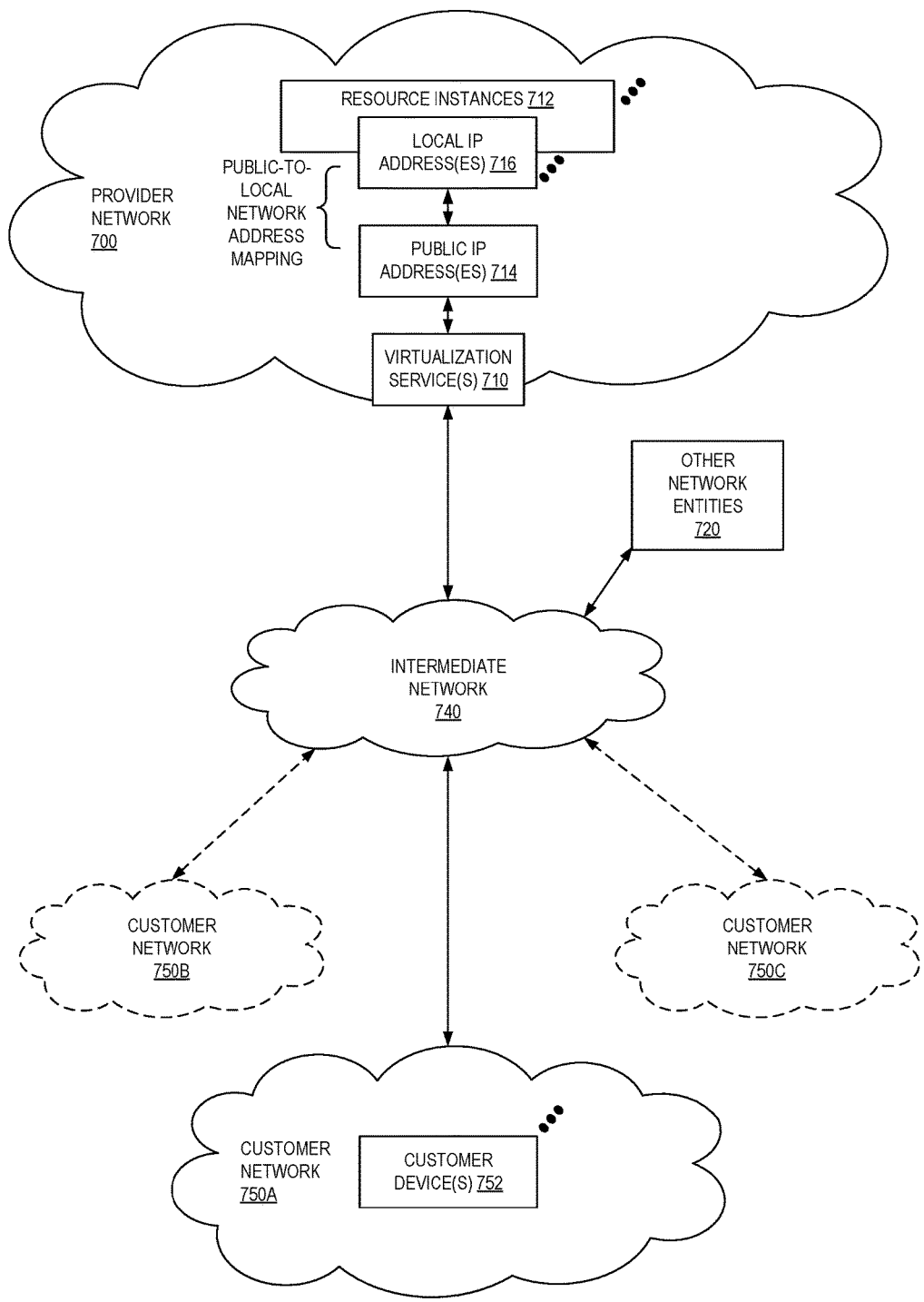
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
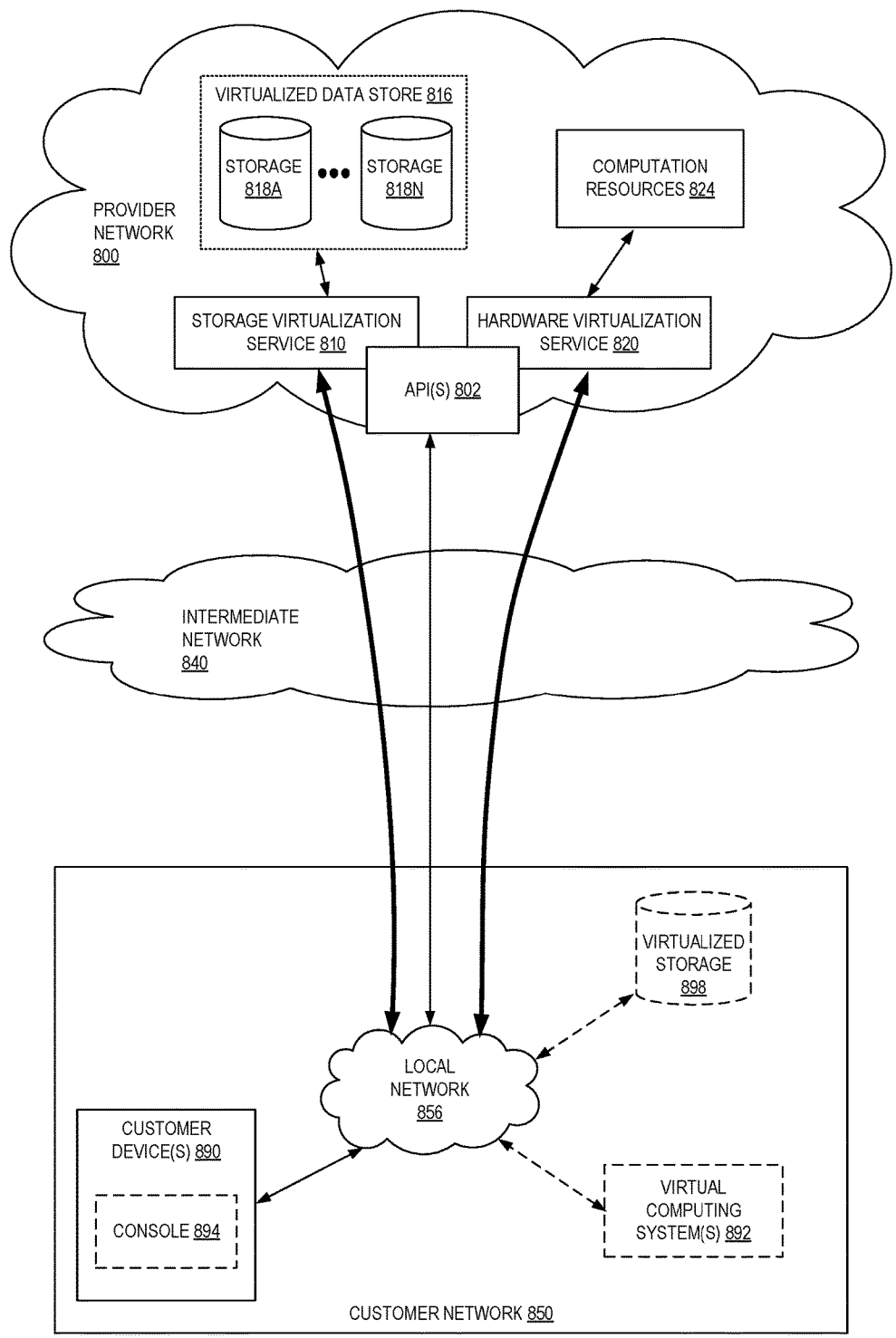
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
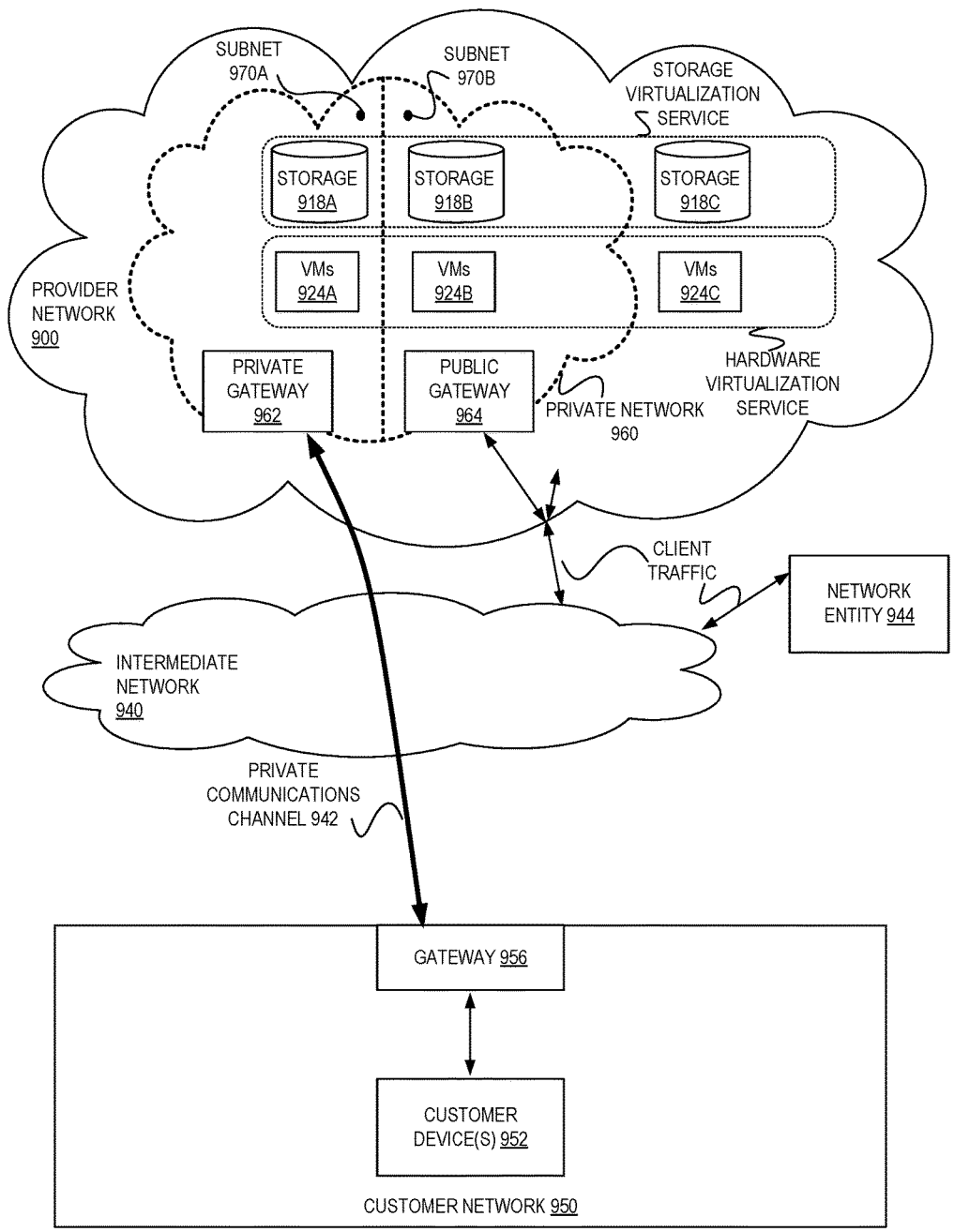
FIG. 9 illustrates an example provider network that provides virtual networks on the provider network to at least some customers according to some embodiments.

FIG. 9 illustrates an example provider network that provides virtual networks on the provider network to at least some customers, according to some embodiments. A customer's virtual network 960 on a provider network 900, for example, enables a customer to connect their existing infrastructure (e.g., devices 952) on customer network 950 to a set of logically isolated resource instances (e.g., VMs 924A and 924B and storage 918A and 918B), and to extend management capabilities such as security services, firewalls, and intrusion detection systems to include their resource instances.

A customer's virtual network 960 may be connected to a customer network 950 via a private communications channel 942. A private communications channel 942 may, for example, be a tunnel implemented according to a network tunneling technology or some other technology over an intermediate network 940. The intermediate network may, for example, be a shared network or a public network such as the Internet. Alternatively, a private communications channel 942 may be implemented over a direct, dedicated connection between virtual network 960 and customer network 950.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 960 for a customer on provider network 900, one or more resource instances (e.g., VMs 924A and 924B and storage 918A and 918B) may be allocated to the virtual network 960. Note that other resource instances (e.g., storage 918C and VMs 924C) may remain available on the provider network 900 for other customer usage. A range of public IP addresses may also be allocated to the virtual network 960. In addition, one or more networking nodes (e.g., routers, switches, etc.) of the provider network 900 may be allocated to the virtual network 960. A private communications channel 942 may be established between a private gateway 962 at virtual network 960 and a gateway 956 at customer network 950.

In some embodiments, in addition to, or instead of, a private gateway 962, virtual network 960 may include a public gateway 964 that enables resources within virtual network 960 to communicate directly with entities (e.g., network entity 944) via intermediate network 940, and vice versa, instead of or in addition to via private communications channel 942.

Virtual network 960 may be, but is not necessarily, subdivided into two or more subnetworks, or subnets, 970. For example, in implementations that include both a private gateway 962 and a public gateway 964, a virtual network 960 may be subdivided into a subnet 970A that includes resources (VMs 924A and storage 918A, in this example) reachable through private gateway 962, and a subnet 970B that includes resources (VMs 924B and storage 918B, in this example) reachable through public gateway 964.

The customer may assign particular customer public IP addresses to particular resource instances in virtual network 960. A network entity 944 on intermediate network 940 may then send traffic to a public IP address published by the customer; the traffic is routed, by the provider network 900, to the associated resource instance. Return traffic from the resource instance is routed, by the provider network 900, back to the network entity 944 over intermediate network 940. Note that routing traffic between a resource instance and a network entity 944 may require network address translation to translate between the public IP address and the local IP address of the resource instance.

Some embodiments may allow a customer to remap public IP addresses in a customer's virtual network 960 as illustrated in FIG. 9 to devices on the customer's external network 950. When a packet is received (e.g., from network entity 944), the network 900 may determine that the destination IP address indicated by the packet has been remapped to an endpoint on external network 950 and handle routing of the packet to the respective endpoint, either via private communications channel 942 or via the intermediate network 940. Response traffic may be routed from the endpoint to the network entity 944 through the provider network 900, or alternatively may be directly routed to the network entity 944 by the customer network 950. From the perspective of the network entity 944, it appears as if the network entity 944 is communicating with the public IP address of the customer on the provider network 900. However, the network entity 944 has actually communicated with the endpoint on customer network 950.

While FIG. 9 shows network entity 944 on intermediate network 940 and external to provider network 900, a network entity may be an entity on provider network 900. For example, one of the resource instances provided by provider network 900 may be a network entity that sends traffic to a public IP address published by the customer.

Figure 10:
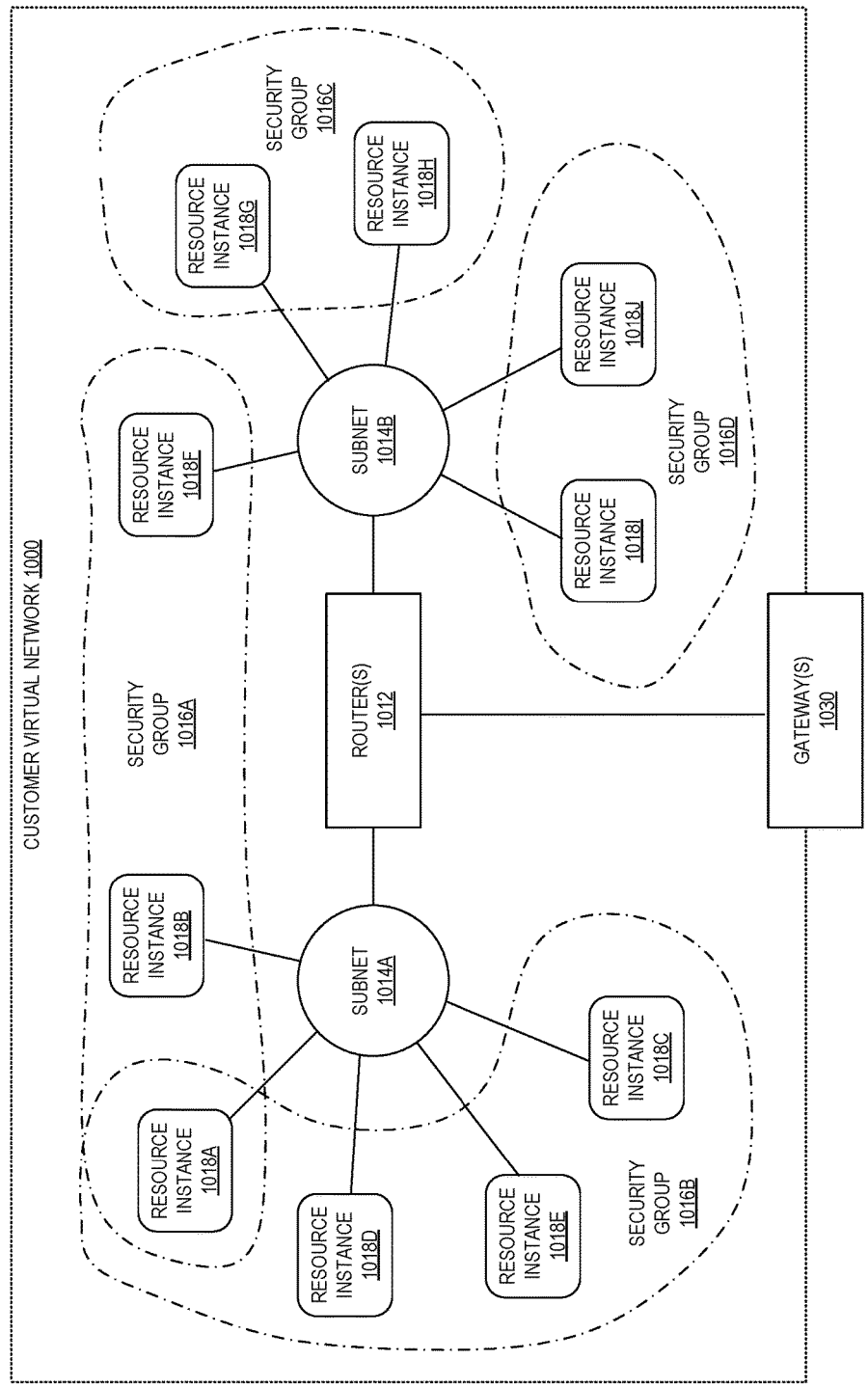
FIG. 10 illustrates subnets and security groups in an example virtual network on a provider network according to some embodiments.

FIG. 10 illustrates subnets and security groups in an example virtual network on a provider network, according to some embodiments. In some embodiments, a provider network such as provider network 900 in FIG. 'N may allow the customer to establish and manage virtual security groups 1016 within the customer's virtual network 1010, within or across subnets 1014. A security group 1016 is a logical grouping of resource instances 1018 and acts as a virtual firewall that controls the traffic allowed to reach one or more resource instances 1018 within the security group 1016 according to security group rules. The customer may establish one or more security groups 1016 within the virtual network 1010, and may associate each resource instance 1018 in the virtual network 1010 with one or more of the security groups 1016. In some embodiments, the customer may establish and/or modify rules for each security group 1016 that control the inbound traffic allowed to reach the resource instances 1018 associated with the security group 1016.

In the example virtual network 1010 shown in FIG. 10, the virtual network 1010 is subdivided into two subnets 1014A and 1014B. Access to the virtual network 1010 is controlled by gateway(s) 1030. Each subnet 1014 may include at least one router 1012 that acts to route traffic to (and from) resource instances 1018 on the respective subnet 1014. In some embodiments, network access control lists (ACLs) may be used to control access to the subnets 1014 at router(s) 1012. In the example shown in FIG. 10, resource instances 1018A through 1018E are on subnet 1014A, and resource instances 1018F through 1018J are on subnet 1014B. The customer has established four security groups 1016A through 1016D. As shown in FIG. 10, a security group may extend across subnets 1014, as does security group 1016A that includes resource instances 1018A and 1018B on subnet 1014A and resource instance 1018F on subnet 1014B. In addition, a resource instance 1018 may be included in two or more security groups 1016, as is resource instance 1018A which is included in security group 1016A and 1016B.

Illustrative System

Figure 11:
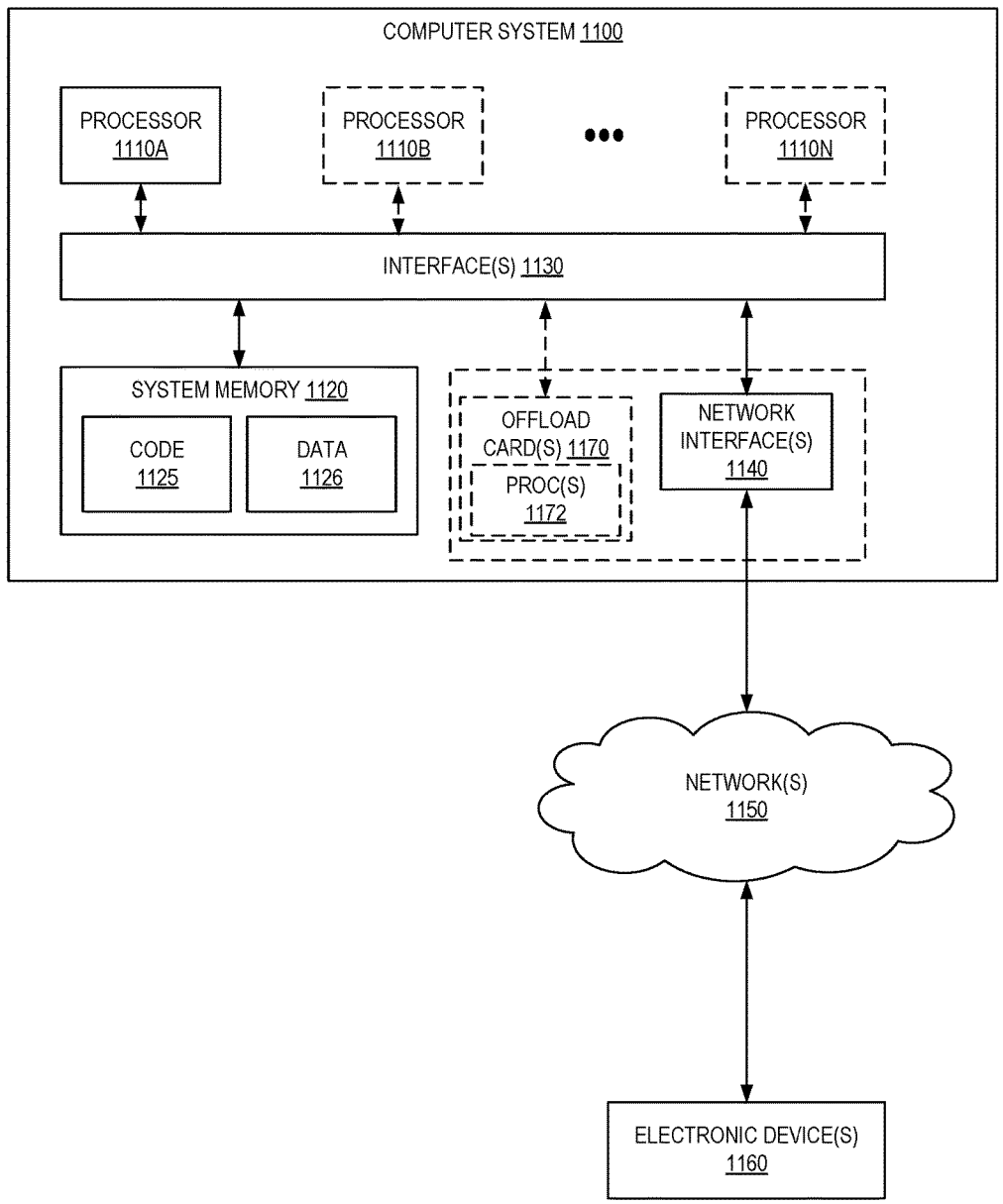
FIG. 11 is a block diagram illustrating an example computer system that may be used in some embodiments.

In some embodiments, a system that implements a portion or all of the techniques for replicating a customer's IT infrastructure at a service provider network as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1172, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities, and may not coordinate with (or service) any hypervisor.

In some embodiments, system memory 1120 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 204A-204E and 404A-404E) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining discovery data from a customer network, the discovery data identifying at least two servers of an information technology (IT) infrastructure located in the customer network;
generating an infrastructure template based on the discovery data, the infrastructure template including server migration settings used to migrate the at least two servers from the customer network to a service provider network;
receiving a request to replicate the IT infrastructure located in the customer network at the service provider network; and
replicating the IT infrastructure at the service provider network, the replicating including, for each of the at least two servers identified by the discovery data:
obtaining replication data for the server from the customer network based on the server migration settings of the infrastructure template, and
creating a replicated instance of the server at the service provider network based on the replication data.

2. The computer-implemented method of claim 1, wherein the infrastructure template further includes system configuration settings relating to one or more of: a subnet configuration, a security group configuration, a routing configuration; and
wherein the replicating further comprises configuring one or more system settings based on the system configuration settings.

3. The computer-implemented method of claim 1, the method further comprising:
obtaining delta replication data from the customer network for a server of the at least two servers; and
updating a replicated server instance corresponding to the server at the service provider network based on the delta replication data.

4. A computer-implemented method comprising:
receiving, over one or more networks, a request to replicate at a service provider network an information technology (IT) infrastructure located within a customer network;
obtaining an infrastructure template associated with the IT infrastructure, the infrastructure template including server migration settings used to migrate at least two servers from the customer network to the service provider network;
obtaining replication data for the at least two servers from the customer network based on the server migration settings; and
creating, based on the replication data, replicated server instances at the service provider network replicating the at least two servers.

5. The computer-implemented method of claim 4, wherein the infrastructure template further includes system configuration settings relating to one or more of: a subnet configuration, a security group configuration, a routing configuration, and the method further comprising:
configuring one or more system settings related to the replicated server instances at the service provider network based on the system configuration settings.

6. The computer-implemented method of claim 4, further comprising:
obtaining delta replication data from the customer network for a server of the at least two servers; and
updating a replicated instance corresponding to the server at the service provider network based on the delta replication data.

7. The computer-implemented method of claim 4, wherein the IT infrastructure includes one or more of: a virtual server, a physical server, a public subnet, a private subnet, a virtual private cloud (VPC) configuration, a routing table, a security group configuration, a software configuration.

8. The computer-implemented method of claim 4, further comprising:
obtaining discovery data from the customer network, the discovery data identifying the at least two servers of the IT infrastructure located in the customer network; and
generating the infrastructure template based on the discovery data.

9. The computer-implemented method of claim 4, wherein the server migration settings include a mapping between at least one of the at least two servers and a server instance type supported by the service provider network.

10. The computer-implemented method of claim 4, wherein the replication data includes one or more of: a disk snapshot, a memory snapshot, a machine image.

11. The computer-implemented method of claim 4, wherein creating each replicated server instance at the service provider network includes one or more of: creating a disk volume, storing a virtual machine (VM) in the disk volume, injecting drivers into the disk volume, creating a snapshot of the VM stored in the disk volume, creating a machine image of the VM based on the snapshot, storing the machine image at a storage location accessible to a customer account.

12. The computer-implemented method of claim 4, wherein the replication data is created by a migration proxy at the customer network, the creating including one or more of: obtaining disk snapshots from a VM manager used to manage the servers, obtaining a disk snapshot of a physical server corresponding to the server, obtaining a data stream reflecting changes to a disk associated with the servers.

13. The computer-implemented method of claim 4, further comprising:
detecting a failure associated with a server of the at least two servers; and
creating a replicated instance of the server, the replicated instance of the server to be used as a failover copy of the server.

14. The computer-implemented method of claim 4, further comprising:
detecting a failure associated with a server of the at least two servers at the customer network; and
creating a replicated instance of the server at the service provider network, the replicated instance of the server to be used as a failover copy of the server;
detecting that the server is repaired;
generating a snapshot of the replicated instance of the server at the service provider network; and
sending the snapshot to the customer network.

15. The computer-implemented method of claim 4, further comprising:

detecting one or more changes to the IT infrastructure located with the customer network; and updating the infrastructure template to reflect the one or more changes.

16. A system comprising:

an IT infrastructure modeling service implemented by a first one or more electronic devices, the IT infrastructure modeling service comprising instructions which, when executed by the first one or more electronic devices, cause the IT infrastructure modeling service to:
- obtain discovery data associated with a customer network, the discovery data identifying at least two servers of an IT infrastructure located in the customer network,
- generate an infrastructure template based on the discovery data, the infrastructure template including server migration settings used to migrate the at least two servers from the customer network to a service provider network,
- send instructions to a server migration service to migrate the at least two servers from the customer network to the service provider network to obtain replication data for the at least two servers, and
- create replicated instances of the at least two servers based on machines images generated from the replication data; and the server migration service implemented by a second one or more electronic devices, the server migration service including instructions that upon execution cause the server migration service to:
- receive instructions to migrate the at least two servers from the customer network to the service provider network,
- obtain replication data for the at least two servers from the customer network,
- generate machine images for the at least two servers based on the replication data, the machine images used by the IT infrastructure modeling service to create the replicated instance of the at least two servers.

17. The system of claim 16, wherein the infrastructure template further includes system configuration settings relating to one or more of: a subnet configuration, a security group configuration, a routing configuration; and
wherein the replicating further comprises configuring one or more system settings based on the system configuration settings.

18. The system of claim 16, wherein the instructions, when executed by the second one or more electronic devices, further cause the server migration service to:
- obtain delta replication data from the customer network for a server of the at least two servers; and
- update a replicated instance corresponding to the server at the service provider network based on the delta replication data.

19. The system of claim 16, wherein the IT infrastructure includes one or more of: a virtual server, a physical server, a public subnet, a private subnet, a virtual private cloud (VPC) configuration, a routing table, a security group, a software configuration.

20. The system of claim 16, wherein the instructions, when executed by the first one or more electronic devices, further cause the IT infrastructure modeling service to:
- obtain discovery data from the customer network, the discovery data identifying the at least two servers of the IT infrastructure located in the customer network; and
- generate the infrastructure template based on the discovery data.

* * * * *